(12) United States Patent
Kurfuerst et al.

(10) Patent No.: US 10,756,585 B2
(45) Date of Patent: Aug. 25, 2020

(54) ELECTRICAL MACHINE WITH ROTOR HAVING PERMANENT MAGNETS DISPOSED IN ASSOCIATED RADIAL POCKETS

(71) Applicant: Baumueller Nuernberg GmbH, Nuremberg (DE)

(72) Inventors: Jiri Kurfuerst, Bystrice nad Pernštejnem (CZ); Jiri Skoda, Brno (CZ); Tomás Jindra, Velka Losenice (CZ); Jan Rezek, Jaromerice nad Rokytnou (CZ); Ladislav Knebl, Novy Jicin (CZ)

(73) Assignee: Baumueller Nuernberg GmbH, Nuremberg (DE)

( * ) Notice: Subject to any disclaimer, the term of this patent is extended or adjusted under 35 U.S.C. 154(b) by 0 days.

(21) Appl. No.: 16/219,017

(22) Filed: Dec. 13, 2018

(65) Prior Publication Data
US 2019/0181703 A1   Jun. 13, 2019

(30) Foreign Application Priority Data
Dec. 13, 2017   (DE) .......... 10 2017 222 683

(51) Int. Cl.
*H02K 1/27* (2006.01)
*H02K 7/00* (2006.01)
*H02K 1/32* (2006.01)
*H02K 1/24* (2006.01)

(52) U.S. Cl.
CPC .......... *H02K 1/276* (2013.01); *H02K 1/246* (2013.01); *H02K 1/2766* (2013.01); *H02K 1/32* (2013.01); *H02K 7/006* (2013.01)

(58) Field of Classification Search
CPC   H02K 1/27; H02K 1/276; H02K 1/24; H02K 1/246; H02K 1/32; H02K 7/006
USPC ............ 310/156.01, 156.51, 156.36, 156.47, 310/156.84
See application file for complete search history.

(56) References Cited

U.S. PATENT DOCUMENTS

| 6,047,460 A | 4/2000 | Nagate et al. |
| 6,133,662 A | 10/2000 | Matsunobu et al. |
| 2003/0090167 A1 | 5/2003 | Kajiura et al. |
| 2003/0230948 A1* | 12/2003 | Murakami ............. H02K 1/276 310/156.53 |
| 2006/0119203 A1* | 6/2006 | Brown ................... H02K 1/276 310/156.53 |

(Continued)

FOREIGN PATENT DOCUMENTS

| EP | 2995820 A1 | 3/2016 |
| EP | 3 208 917 A1 | 8/2017 |

*Primary Examiner* — Tulsidas C Patel
*Assistant Examiner* — Rashad H Johnson
(74) *Attorney, Agent, or Firm* — Muncy, Geissler, Olds & Lowe, P.C.

(57) ABSTRACT

An electrical machine, in particular a synchronous reluctance motor, having a rotor having a number of similar permanent magnets, each of which is disposed in each case in an associated pocket of the rotor. Permanent magnets adjacent in a tangential direction can be installed only in one position in the respective pocket, in which the magnetization directions is rotated by 180° with respect to a radial straight line associated with the respective permanent magnet. A rotor of an electrical machine is also provided.

14 Claims, 5 Drawing Sheets

(56) References Cited

U.S. PATENT DOCUMENTS

| | | | |
|---|---|---|---|
| 2011/0101815 A1* | 5/2011 | Finkle | H02K 21/028 |
| | | | 310/191 |
| 2012/0098359 A1* | 4/2012 | Morozumi | H02K 7/04 |
| | | | 310/51 |
| 2012/0274168 A1 | 11/2012 | Holzner et al. | |
| 2015/0084471 A1* | 3/2015 | Huh | H02K 29/12 |
| | | | 310/156.78 |
| 2016/0211711 A1* | 7/2016 | Yazaki | H02K 15/03 |
| 2016/0315526 A1 | 10/2016 | Kaneshige et al. | |
| 2019/0238017 A1* | 8/2019 | Ohira | H02K 1/32 |

\* cited by examiner

ELECTRICAL MACHINE WITH ROTOR HAVING PERMANENT MAGNETS DISPOSED IN ASSOCIATED RADIAL POCKETS

This nonprovisional application claims priority under 35 U.S.C. § 119(a) to German Patent Application No. 10 2017 222 683.8, which was filed in Germany on Dec. 13, 2017, and which is herein incorporated by reference.

BACKGROUND OF THE INVENTION

Field of the Invention

The present invention relates to an electrical machine comprising a rotor having a number of permanent magnets, each of which is disposed in each case in an associated pocket of the rotor. Furthermore, the invention relates to a rotor of an electrical machine. The electrical machine can be a synchronous reluctance motor. Alternatively or in combination therewith, the electrical machine can be a component of, for example, a commercial vehicle/motor vehicle.

Description of the Background Art

Motor vehicles are powered by a motor. This is designed, for example, as an internal combustion engine in which a rotational movement of the motor vehicle wheels is generated by combustion of energy sources. As an alternative, electric motors are used which are operatively connected to the wheels. The electrical motor itself is operated by means of a motor vehicle battery, which must be charged at time intervals. This is usually done by means of a stationary supplier network. These motor vehicles are thus so-called fully electric motor vehicles. In the case of these vehicles, it is also known further to take electric power from a possible overhead line, wherein the motor vehicle is moved along the overhead line. Alternative drive concepts provide that the electrical energy for the operation of the electric motor is provided by the internal combustion engine, wherein the internal combustion engine is operated in an optimal operating state, regardless of the actual motor vehicle speed. In other words, this concerns a hybrid motor vehicle.

In order to improve complexity and efficiency, no gearing or only gearing with a relatively low gear ratio is mechanically connected between the electric motor and the driven wheel. Thus, it is necessary that a relatively large torque is provided at a relatively low speed by the electric motor.

Electrical machines usually have permanent magnets which are fastened to a rotor body. In this case, it is necessary for the permanent magnets to be arranged in a specific orientation with respect to the rotor body, so that magnetic poles form at specific, predefined positions of the rotor. The permanent magnets usually have a substantially rectangular cross section. Thus, it is initially not clearly identifiable in which direction the magnetization direction of the permanent magnet points. Consequently, the actual magnetization direction must always be determined prior to mounting on the rotor body, which increases cost. Alternatively, the permanent magnets are already manufactured differently and mounted differently according to their magnetization direction, which simplifies assembly. In this case, however, additional mounting is required, so that production and in particular the cost of production are increased.

SUMMARY OF THE INVENTION

It is therefore an object of the present invention to provide an especially suitable electrical machine and an especially suitable rotor of an electrical machine, wherein production is advantageously simplified.

The electrical machine has a rotor. For example, the electrical machine is a brushed machine. Particularly preferably, however, the electrical machine is designed brushless. For example, the electrical machine is a generator. However, the electrical machine is particularly preferably an electric motor, in particular a brushless electric motor. The electrical machine is in particular a synchronous machine, such as a synchronous motor. Preferably, during operation, the electrical machine is electrically connected to a converter and is operated by it or comprises the converter. For example, the electrical machine has an output of between 30 kW and 150 kW, between 40 kW and 140 kW, or between 60 kW and 100 kW, and in particular equal to 80 kW, wherein, for example, there is a deviation of 10 kW, 5 kW, 2 kW, or 0 kW. Alternatively, the electrical machine has, in particular, an output of between 0.1 kW and 30 kW, between 0.2 kW and 25 kW, or between 0.3 kW and 19 kW and, in particular, equal to 10 kW, wherein, for example, there is a deviation of 2 kW, 1 kW, 0.5 kW, or 0 kW. Suitably, the electrical machine has a speed, for example, a rated speed or maximum speed, between 10 1/min and 800 1/min, between 30 1/min and 600 1/min, between 50 1/min and 500 1/min, or between 100 1/min and 400 1/min, wherein, in particular, there is a deviation of 100 1/min, 50 1/min, 20 1/min, or 0 1/min. Alternatively, the electrical machine expediently has a speed, for example, a rated speed or maximum speed, between 10 1/min and 5000 1/min, between 100 1/min and 3000 1/min, between 1000 1/min and 3000 1/min, or between 2000 1/min and 3000 1/min, wherein, in particular, there is a deviation of 500 1/min, 200 1/min, 100 1/min, or 0 1/min. Particularly preferably, the electrical machine has a torque, for example, a maximum and/or rated torque, between 10 Nm and 2000 Nm, between 15 Nm and 175 Nm, between 20 Nm and 150 Nm, between 50 Nm and 100 Nm, or between 50 Nm and 80 Nm, wherein, in particular, in each case there is a deviation of 50 Nm, 20 Nm, 10 Nm, or 0 Nm.

The electrical machine is, for example, a permanently excited synchronous motor. Particularly preferably, the electrical machine is a synchronous reluctance motor. In other words, the electrical machine is a three-phase synchronous machine, wherein the rotor preferably has a flux barrier portion or salient poles. In this case, during operation, a rotational movement of the rotor is caused in particular at least in addition due to the reluctance force, wherein, for example, the Lorentz force additionally contributes to providing the rotational movement. Particularly preferably, however, the rotational movement of the rotor is caused only by the reluctance force.

For example, the electrical machine is a component of a commercial/motor vehicle and in particular a drive of the commercial/motor vehicle. Particularly preferably, the electrical machine is a component of a main drive of the commercial/motor vehicle and thus is used for the propulsion of the commercial/motor vehicle. For this purpose, in the assembled state, the electrical machine is coupled, for example, to a wheel of the commercial/motor vehicle, for example, directly or indirectly via a gear. In other words, the electrical machine forms a main engine of the commercial/motor vehicle or at least one of the main engines of the commercial/motor vehicle, if the commercial/motor vehicle has a number of main engines. In a further alternative, the electrical machine is a component of a bicycle, in particular a so-called e-bike. In further embodiments of the invention, the electrical machine is a component of an industrial plant and serves in particular to drive an actuator of the industrial plant, such as a conveyor belt, a robot, or a component for processing or manufacturing a component, such as a press or a caterpillar conveyor. For example, the electrical machine is part of a bottling plant, an injection molding machine, or a textile machine.

The rotor is in particular rotatably mounted about an axis of rotation that is parallel to an axial direction. Suitably, the rotor is designed rotationally symmetric with respect to the axis of rotation. In particular, the electrical machine has a shaft, which is made, for example, of a steel. The shaft is expediently disposed concentric with the axis of rotation, and the rotor is suitably placed on the shaft. For this purpose, the rotor expediently has a suitable cavity, so that the rotor is designed substantially as a hollow cylinder. Preferably, the rotor is connected rotationally fixed to the shaft, for example, by means of a tongue and groove connection.

The rotor has a number of similar permanent magnets. In other words, the permanent magnets do not differ, wherein differences possibly arise in particular only due to manufacturing tolerances. Thus, in particular, the shape of the permanent magnets is the same and their preferred directions are also preferably the same. Suitably, at least one preferred direction of the permanent magnets is predetermined by the particular magnetization direction, and the magnetization direction is the same with respect to further features of the particular permanent magnets. In other words, the permanent magnets cannot be differentiated in particular. The rotor has a number of pockets, which suitably corresponds to the number of permanent magnets. In this case, one permanent magnet each is disposed in each case in one of the pockets. In other words, each permanent magnet is associated in each case with one of the pockets of the rotor, and each permanent magnet is disposed in the respective pocket. Preferably, each permanent magnet is stabilized by the respective pocket. For example, the permanent magnets are spaced apart from one another. In other words, the permanent magnets do not abut each other mechanically directly and in particular are spaced from one another by means of the pockets. The pockets themselves are also suitably spaced from one another. The permanent magnets are preferably spaced from one another in a tangential direction, therefore, in particular in a circumferential direction. Suitably, the distance between the permanent magnets and the axis of rotation is the same and/or constant.

The permanent magnets can only be installed in one, in particular only, position in the respective pocket. In other words, the permanent magnets can be disposed in the respective pockets only in a single way. Thus, both the orientation of the permanent magnets and their position are predetermined by the pockets. In this case, each permanent magnet is associated with a respective radial straight line by means of which in particular a magnetization direction of the permanent magnet is determined. Here, the magnetization directions of each adjacent permanent magnet are rotated by 180° with regard to the respective associated radial straight line. In other words, the magnetization direction of the adjacent permanent magnets differs with regard to the respective radial straight line, namely by substantially exactly 180°, wherein, for example, there is a deviation of 5°, 2°, or 0. Thus, the magnetization direction of the permanent magnets with regard to the respective radial straight lines is predetermined by the pockets.

Due to the similarity of all permanent magnets, fabrication of the permanent magnets is relatively inexpensive, and common parts can be used. In this case, the magnetization direction of the permanent magnets with respect to the other components of the rotor, and suitably the radial straight lines as well, are predetermined by the pockets and the unique positioning of the permanent magnet within them, so that a laborious determination of the magnetization direction or a different mounting of the permanent magnets is not required. Rather, only a single installation position is possible. Thus, incorrect installation of the permanent magnets and thus a wrong form of magnetic poles of the rotor are excluded, so that, in one respect, quality is increased and waste is reduced. In addition, production is relatively simple, which is why production costs are reduced. For example, the pockets and/or permanent magnets are designed such that they can be installed only in the specific position in the respective pocket. In particular, the permanent magnets can only be arranged in a single position in the respective pocket. Thus, only insertion of the permanent magnets in the pockets in the specific position is possible. Due to the change of the magnetization direction between adjacent permanent magnets, formation of magnetic poles of the rotor is simplified.

In particular, each of the permanent magnets and/or each pocket has a specific feature, so that only installation in the specific position is possible. For example, adjacent pockets are different in the tangential direction, and in particular, the next-but-one pockets in the tangential direction are similar and, in particular, symmetric and/or similar with regard to the respective associated radial straight lines. For example, the rotor has eight such permanent magnets and thus preferably also eight such pockets.

The permanent magnets can be made of or comprise NdFeB, for example. Particularly preferably, however, permanent magnets are made of a ferrite, which reduces manufacturing costs. For example, the rotor has a number of cooling openings, which extend through the rotor in an axial direction, for example. The cooling openings are made, for example, cylindrical, wherein the cross section, for example, is made round or polygonal, for example, triangular. During operation, a fluid is preferably passed through the cooling openings. The cooling openings are suitable, in particular provided, and set up for this purpose. The cooling fluid is, for example, a liquid or particularly preferably a gas, such as air, which reduces manufacturing costs.

In particular, the electrical machine has a stator, which preferably has a number of electromagnets. The electromagnets are expediently interconnected to form a number of phases, in particular three phases. The phases themselves are expediently contacted with one another in a triangular or star connection. The phases are expediently energized by a frequency converter. The frequency converter is, for example, a component of the electrical machine, or the electrical machine has suitable connections for a frequency converter of this kind, for example, a connection terminal. In this case, the frequency converter and the electrical machine are expediently components of a drive. The frequency converter preferably has a bridge circuit, for example, a B6 circuit. The electrical machine is, for example, an external rotor. Particularly preferably, however, the electrical machine is an internal rotor. In other words, the stator surrounds the rotor circumferentially, therefore, in particular in a radial direction.

Particularly preferably, the rotor comprises a laminated core which has a number of sheets stacked one above the other in the axial direction. The sheets are expediently made of an iron, in particular a soft iron, and electrically insulated from one another. In particular, the sheets are made of a transformer plate. The sheets are expediently designed similar and preferably arranged aligned one above the other. In particular, the sheets are created by punching. Preferably, each sheet layer is designed in one piece. In other words, each layer of the laminated core is formed in the axial direction by means of only a single sheet. The laminated core has the pockets extending in particular in the axial direction through the laminated core. In particular, the pockets are closed in the tangential direction and the radial direction. In other words, the pockets are opened only in the axial direction, so that insertion of the permanent magnets in the respective pockets is possible only in the axial direction. After assembly, the permanent magnet is surrounded by the laminated core both in the radial and tangential direction. In this case, an electrical insulation is disposed in particular between the permanent magnets and the laminated core; for example, the permanent magnets are provided with a coating.

One of the end faces of the laminated core is partially covered with a first pressure plate, which preferably mechanically directly abuts the end face of the sheet, in particular one of the sheets of the laminated core. The first pressure plate is offset inward in the radial direction with respect to the pockets. In other words, the pockets are not covered by the first pressure plate and are thus freely accessible. The first pressure plate non-positively abuts the laminated core and is expediently mounted on it. Thus, the laminated core is stabilized by means of the first pressure plate. Expediently, the rotor has a further first pressure plate with which the further end face of the laminated core, therefore, the end of the laminated core in the axial direction, is covered, and which is also offset inward in the radial direction with respect to the pockets.

The laminated core can be held non-positively between the two first pressure plates. For example, the two first pressure plates are designed differently. Particularly preferably, however, the first pressure plates are similar, so that common parts can be used, which reduces production costs. In particular, in this case screws or threaded rods or other fastener(s) protrude through the laminated core, by means of which the two first pressure plates are fastened together, so that the laminated core is clamped between the two first pressure plates. Thus, the laminated core is stabilized with the two first pressure plates or at least with one of the first pressure plates, so that detachment of individual sheets from one another is prevented. Thus, a fastening together of the individual sheets of the laminated core is not required, which simplifies production. Particularly preferably, however, the sheets are already connected to one another, for example, baked or punch-stacked. Here, a stability of the laminated core is increased by the first pressure plate, in particular by the two first pressure plates, so that upon mounting of the laminated core on other components of the rotor or the possible shaft, detachment of the laminated core is prevented. The first pressure plate is made, for example, of a metal or particularly preferably of a plastic. Thus, an electrical short circuit is prevented and manufacturing costs are reduced. In particular, the first pressure plate is a plastic injection-molded part. If the rotor, in particular the laminated core, has the cooling openings, the first pressure plate, in particular both first pressure plates, if present, likewise have openings aligned therewith, so that the cooling fluid can pass unhindered through the first pressure plates during operation. Suitably, the first pressure plate is disposed concentric with the axis of rotation and/or rotationally symmetric with respect to it. Further, replacement is possible in the case of problems during the manufacture of the electrical machine, in particular in the case of damage to one of the permanent magnets during or after its assembly. In this case, the effort is relatively small, and the damaged permanent magnet is removed from the pocket in particular by means of pressure application in the axial direction and replaced by a new permanent magnet.

The design of the rotor with the laminated core and the first pressure plate, which is offset inward in the radial direction with respect to the pockets, is independent of the installation of the permanent magnets only in the single position and is considered rather as an independent invention. In other words, the electrical machine with the laminated core which contains the pockets and which has the number of sheets stacked one above the other in the axial direction, is considered to be an independent invention, wherein one of the end faces of the laminated core is partially covered by the first pressure plate, which is offset inward in the radial direction with respect to the pockets, and non-positively abuts the laminated core, wherein in particular the laminated core is held non-positively between the two such first pressure plates.

One of the end faces of the laminated core is at least partially, for example, completely, covered by a second pressure plate. The pockets are at least partially covered, for example, completely, by the second pressure plate. In other words, the second pressure plate protrudes in the radial direction at least partially over the openings of the pockets. Thus, the permanent magnets are also covered in the assembled state by the second pressure plate, which, for example, mechanically directly abuts the permanent magnet. Thus, detachment of the permanent magnets in the axial direction out of the pockets is prevented by the second pressure plate. Suitably, the second pressure plate is on the same side of the laminated core as the first pressure plate. In this case, in particular the first pressure plate is disposed in the axial direction between the laminated core and the second pressure plate. For example, the second pressure plate is fastened to the first pressure plate. The second pressure plate preferably has a recess for the first pressure plate, so that the second pressure plate also mechanically directly abuts the laminated core or at least the permanent magnet. Thus, the second pressure plate surrounds the first pressure plate at least partially, and the second pressure plate is thus also stabilized by the laminated core and the first pressure plate. Preferably, the second pressure plate is disposed concentric with the axis of rotation and/or rotationally symmetric with respect to it.

Both end faces of the laminated core can each be covered with an associated second pressure plate. In other words, the rotor has a further second pressure plate. Preferably, the two second pressure plates are structurally identical, which reduces manufacturing costs. Alternatively, the two second pressure plates are different. The second pressure plate is made, for example, of a metal or especially preferably of a plastic. Only relatively small forces, which during operation act on the permanent magnets in the axial direction, are compensated by the second pressure plates. Preferably, the second pressure plate is made filigreed or less robust than the first pressure plate, which reduces the weight of the rotor and thus its inertia. If the two second pressure plates are present, they are fastened, for example, in each case to the laminated core and/or to the first pressure plate or to the two first pressure plates. Alternatively, the two second pressure plates are fastened to one another, for example, by means of a fastener which extends through the laminated core, for example, a screw or threaded rod. In particular, detachment of the sheets from one another is prevented by the first pressure plate when the permanent magnets are inserted into the laminated core, in particular the pockets, in the axial direction.

The invention further relates to a method for producing the electrical machine, in particular the rotor of the electrical machine. In this case, first, the laminated core is provided, in which sheets are stacked on one another in the axial direction. The individual sheets are, for example, already fastened to one another or only loosely placed on one another. In a further step, the first pressure plate is placed non-positively on the laminated core, namely on its end face. In particular, two such first pressure plates are used, and the laminated core is held non-positively between them. In a further step, the permanent magnets are inserted into the pockets of the laminated core in the axial direction. Here, detachment of the sheets from one another is prevented by the first pressure plates, by means of which the laminated core is thus stabilized. In a further step, the second pressure plate is mounted so that detachment of the permanent magnets from the laminated core is prevented. In particular, both end faces of the laminated core are each covered with an associated second pressure plate.

One of the end faces of the laminated core can be covered with the second pressure plate before installation of the permanent magnets, so that a too far insertion of the permanent magnets is prevented. In a further alternative, the laminated core has only a single first pressure plate and a single second pressure plate, each associated with different end faces of the laminated core. In this case, the first pressure plate and the second pressure plate are preferably fastened to one another, for example, by means of the threaded rods, and the laminated core is held non-positively between the first and second pressure plate. Following this, the permanent magnets are inserted into the pockets from the end face, which is associated with the first pressure plate, wherein a too far insertion is prevented by the second pressure plate. As soon as this has taken place, optionally, in particular preferably, the end face, which is associated with the first pressure plate, is covered by the further second pressure plate. The method is in particular independent of the arrangement of the permanent magnets only in a single position of the respective pocket, wherein the magnetization direction is rotated by 180° with respect to the radial straight lines associated with the respective permanent magnet, and is considered in particular as an independent invention.

The radial straight line, which is associated with each permanent magnet, is defined in particular with reference to the axis of rotation, which thus intersects each radial straight line. Suitably, each radial straight line intersects the center of gravity of the respective associated permanent magnet, in particular the center of gravity of the cross section perpendicular to the axis of rotation of the respective associated permanent magnet. Alternatively, the center of the cross section is used as the center of gravity, which center is preferably the same as the center of gravity. However, at least each radial straight line intersects the respective associated permanent magnet or its cross section perpendicular to the axis of rotation. Thus, the position of each permanent magnet is also defined by the radial straight line. In particular, all radial straight lines are arranged rotationally symmetric with respect to the axis of rotation, where the symmetry angle is equal to the fraction of 360° and to the number of radial straight lines. Alternatively or in combination therewith, the symmetry angle (angle of rotation for producing the rotational symmetry) is equal to the fraction of 360° and to the number of permanent magnets. Thus, the magnetization directions are suitably arranged to form magnetic poles. Also, an imbalance of the rotor is thus avoided in particular.

For example, the magnetization direction of each permanent magnet is parallel to the respective tangential direction. Thus, in each case a magnetic pole is formed between permanent magnets adjacent in the tangential direction. Particularly preferably, however, the magnetization directions are substantially parallel to the respective radial straight lines. Suitably, the permanent magnets are magnetized in the radial direction, wherein the magnetization directions alternate between radially inward and radially outward in the case of adjacent permanent magnets. In particular, the magnetization directions are parallel to the respective radial direction, wherein these are directed either radially inward or radially outward. Thus, the magnetic poles of the rotor are formed substantially offset radially outward with respect to each permanent magnet, which is particularly suitable in the design of the electrical machine as a synchronous reluctance motor.

For example, the cross section of the permanent magnets perpendicular to the axial direction has an asymmetry. Alternatively or in combination therewith, the cross section has an indentation, for example, a notch. Particularly preferably, however, the cross section of each permanent magnet perpendicular to the axial direction is trapezoidal, wherein in particular a uniform trapezoid forms the cross section. Thus, in a suitable embodiment of the pockets, each of the permanent magnets can be installed only in the one single position in the respective pocket. Preferably, the cross section is mirror-symmetric in regard to the respective associated radial straight line. Thus, the formation of an imbalance is avoided or at least reduced. Due to the trapezoidal shape, production of permanent magnets is also simplified. Mounting is simplified due to the regular shape and the space requirement is reduced. In further alternatives, the cross section of each permanent magnet is shaped in the form of a crescent, circular segment, or circular sector, or U-shaped.

For example, the cross section of the pockets perpendicular to the axial direction is equal to the cross section of the permanent magnets perpendicular to the axial direction. In this case, a clearance fit is created in particular between each of the pockets and the associated permanent magnet. Thus, on the one hand, installation of the permanent magnets is simplified. On the other hand, each of the permanent magnets is held relatively securely. In addition, therefore, a relatively simple identification of the position is possible in which each permanent magnet can be installed in the respective pocket.

Each of the pockets can be associated with a chamber which adjoins the respective pocket in the tangential direction and is spaced from it. For example, a web is formed between each pocket and the respective chamber in the tangential direction. The extent of the chamber in the region of the pocket in the radial direction expediently corresponds to the extent of the pocket in the radial direction. The chamber itself extends at least partially preferably in the radial direction and preferably extends to the radial outer end of the rotor, wherein the chamber is suitably closed. The chamber is filled in particular with a para- or diamagnetic material, in particular air. Thus, a flux barrier portion is provided by means of the chamber, so that formation of magnetic field lines is improved. Expediently, each of the pockets is associated with two such chambers, which are arranged in the tangential direction on respective opposite sides of the respective pocket. Thus, the number of chambers is twice the number of pockets. As a result, the magnetic properties of the rotor are improved.

Each pocket can be made substantially crescent-shaped pointing outward in the radial direction. In this case, each pocket expediently has a middle section which extends substantially in the tangential direction and within which the respective permanent magnet is expediently installed. Suitably, each pocket has at least one retaining element, for example, notches or projections, by means of which the installing of the respective permanent magnet takes place, in particular a retaining of the respective permanent magnet. In this case, the position in which the respective permanent magnet can be installed is also predetermined by the retaining element. The horns of the crescent shape of the pockets expediently extend nearly to the circumference of the rotor and are thus designed in particular pointing outward in the radial direction. Thus, the flux barrier portion is formed by the pockets themselves, which improves the magnetic properties of the rotor.

The rotor can have a further number of second permanent magnets, wherein the second permanent magnets are in particular identical to one another. The second permanent magnets differ, for example, from the permanent magnets or are also similar to these. Expediently, each of the second permanent magnets is associated with a second pocket, and second permanent magnets adjacent in the tangential direction can be installed only in one position in the respective second pocket, wherein the magnetization direction of each adjacent second permanent magnet is rotated by 180° with respect to a second radial straight line associated with each of the second permanent magnets. For example, one of the second radial straight lines is the same as one of the radial straight lines. In this case, each of the second permanent magnets is preferably associated with one of the permanent magnets and only offset outward in the radial direction with respect to it. In this case, the magnetization direction of each second permanent magnet is expediently the same as the magnetization direction of the respectively associated permanent magnet. Thus, the magnetic fields provided by the permanent magnets are amplified by the second permanent magnets. In particular, each second permanent magnet is spaced apart from the respectively associated permanent magnet and all permanent magnets.

The rotor can have a plurality of such further numbers of permanent magnets, which are spaced relative to the remaining permanent magnets and are each disposed in an associated further pocket. In this case, the magnetization directions of respectively adjacent further permanent magnets differ by 180° with respect to a radial straight line associated with the respective further permanent magnet, and each of the further permanent magnets can be installed in the respectively associated further pocket only in a single position. Preferably, each of the differing permanent magnets or at least the permanent magnet associated with the different numbers are arranged along a mutual radial line and in particular spaced from one another. Suitably, the magnetization direction of the respective group of permanent magnets is the same.

The rotor can be a component of an electrical machine, which is, for example, a synchronous reluctance motor. The rotor is thus suitable, in particular provided and set up to be used within a synchronous reluctance motor. In this case, the rotor is expediently rotated about an axis of rotation during operation. The rotor has a number of pockets and similar permanent magnets, each of which is disposed in each case in one of the pockets, wherein permanent magnets adjacent in a tangential direction can be installed only in a single position in the respective pocket, in which the magnetization direction is rotated by 180° with respect to a radial straight line associated with the respective permanent magnet.

The refinements and advantages stated in connection with the electrical machine are analogously also to be applied to the rotor/method of production and vice versa.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
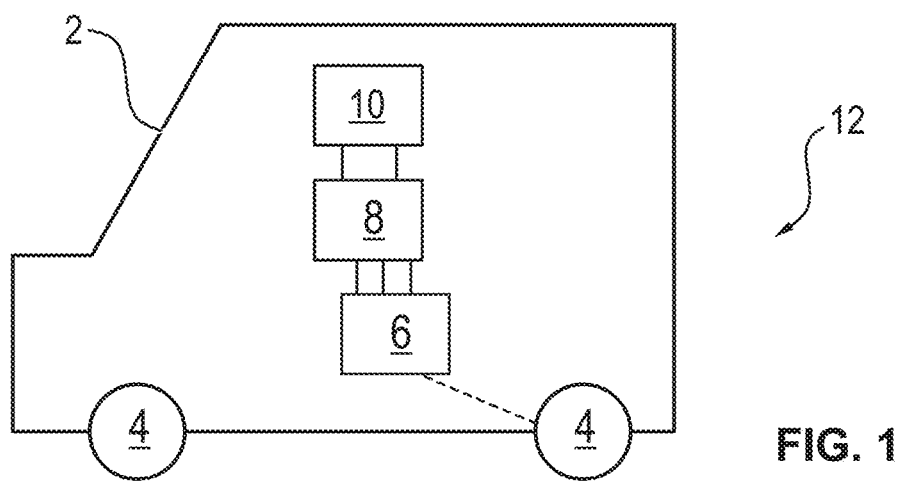
FIG. 1 shows schematically a commercial/motor vehicle with a synchronous reluctance motor.

A motor vehicle 2 with a plurality of wheels 4 is shown schematically simplified in FIG. 1. Motor vehicle 2 is a commercial vehicle, such as a truck, bus, or other transport vehicle, and has four such wheels 4. Further, motor vehicle 2 comprises an electrical machine 6 in the form of a synchronous reluctance motor by means of which at least one of wheels 4 is driven. Electrical machine 6 is energized by a frequency converter 8, which is fed by a high-voltage battery 10. High-voltage battery 10 provides a DC voltage between 400 V and 800 V, which is converted by frequency converter 8 into an alternating current (three-phase current) having three phases. For this purpose, frequency converter 8 has a bridge circuit in detail), namely a B6 circuit. Frequency converter 8 and electrical machine 6 together essentially form a drive 12.

Figure 2:
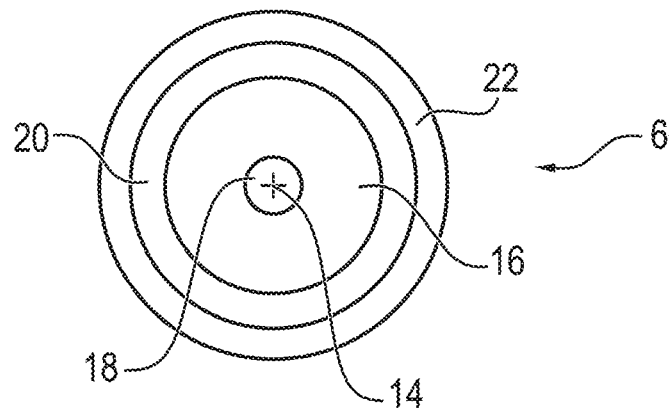
FIG. 2 shows schematically the synchronous reluctance motor with a rotor in a sectional view perpendicular to an axial direction.

In FIG. 2, electrical machine 6 is shown schematically simplified in a cross section perpendicular to a rotation axis 14 of electrical machine 6. Electrical machine 6 has a rotor 16, which is designed substantially as a hollow cylinder and is mounted on a shaft 18 which is arranged concentric with axis of rotation 14. Rotor 16 is mounted rotatably fixed on shaft 18, which is mounted rotatable about axis of rotation 14 by means of bearings, such as ball bearings. Rotor 16 is surrounded circumferentially, with the formation of an air gap 20, by a stator 22 having a number of electromagnets. The electromagnets themselves each comprise an electric coil, wherein the electric coils of stator 22 are connected to form a total of three phases. The phases are connected to one another to form a star connection and are thus offset electrically by 120° to one another. The individual phases are energized by frequency converter 8.

Figure 3:
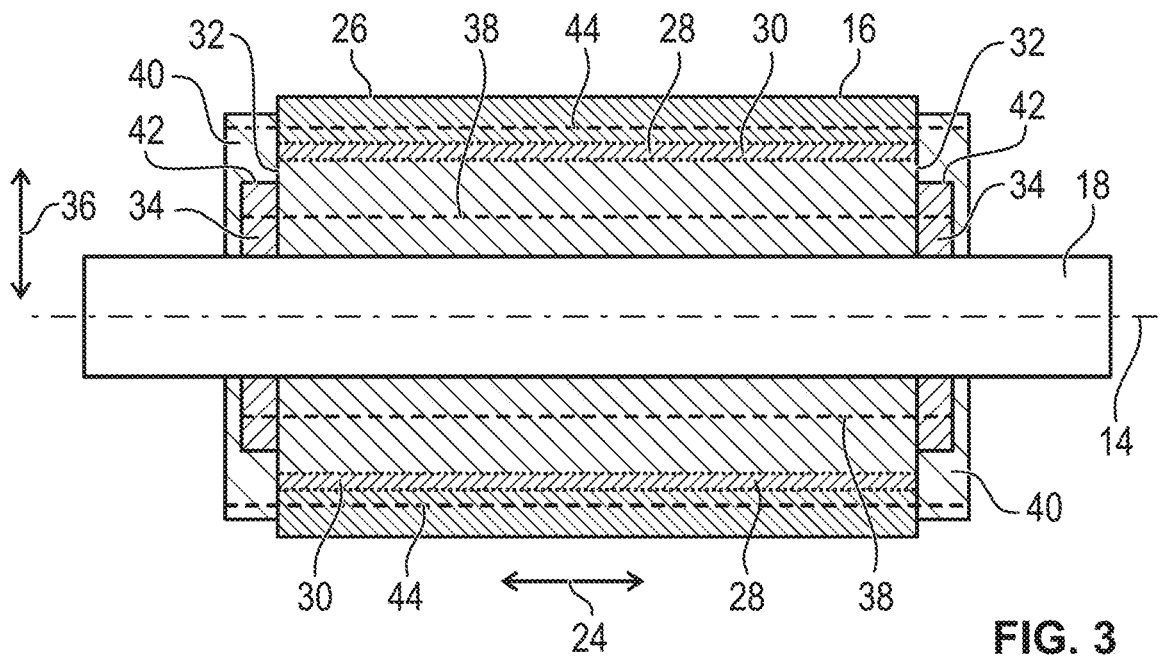
FIG. 3 shows schematically the rotor in a sectional view parallel to the axial direction.

FIG. 3 schematically shows rotor 16 in a sectional view along axis of rotation 14. Shaft 18 in this case projects on both sides beyond rotor 16 in an axial direction 24 and thus extends through it in axial direction 24. Rotor 16 has a laminated core 26, which comprises a number of individual sheets, which are stacked above one another in axial direction 24. Laminated core 26 comprises a plurality of pockets 28, which extend through the core in axial direction 24 and within which a permanent magnet 30 is disposed in each case. Permanent magnets 30 are made of a ferrite, and pockets 28 are open at the ends only in axial direction 24.

Both end faces 32 of laminated core 26, therefore, the ends thereof in axial direction 24, are each covered by a first pressure plate 34; the plates are each made substantially annular and structurally identical to one another. First pressure plates 34 are placed on shaft 18 and are thus in direct mechanical contact therewith. Further, first pressure plates 34 are offset inward in a radial direction 36 with respect to pockets 28 and thus toward axis of rotation 14. In other words, the openings of pockets 28, reaching through laminated core 26, are not covered by first pressure plates 34. First pressure plates 34 are fastened to one another by a number of first threaded rods 38 that pass through corresponding openings in laminated core 26. In this case, first pressure plates 34 are pressed by first threaded rods 38 against laminated core 26. Consequently, laminated core 26 is held non-positively between the two first pressure plates 34, which thus abut laminated core 26 non-positively. Thus, laminated core 26 and in particular the individual sheets of laminated core 26 are stabilized by the two first pressure plates 34.

Further, each end face 32 is associated with a second pressure plate 40, by which the respective end face 32 is at least partially covered. Second pressure plates 40 are structurally identical to one another and made of a plastic. Further, second pressure plates 40 completely cover pockets 28 and are placed on shaft 18 and thus in direct mechanical contact therewith. In addition, each second pressure plate 40 has a cup-shaped recess 42, within which first pressure plate 34 associated with the same end face 32 is disposed. Thus, each first pressure plate 34 is disposed in axial direction 24 between one of second pressure plates 40 and laminated core 26. The two second pressure plates 40 are fastened to one another by second threaded rods 44, which likewise extend through laminated core 26. In an alternative embodiment, second pressure plates 40 are fastened to first pressure plate 34 in each case associated with the same end face 32. Detachment of permanent magnets 30 from pockets 28 in axial direction 24 is prevented by second pressure plates 40.

Figure 4:
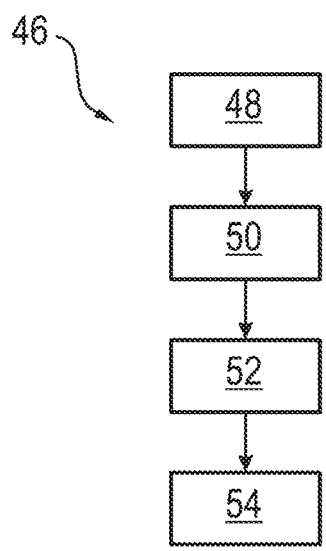
FIG. 4 shows a method for producing the rotor.

FIG. 4 shows a method 46 for producing rotor 16 of electrical machine 6. In a first step 48, laminated core 26 with pockets 28 is provided. Here, the sheets of laminated core 26 are either already attached to one another or only lie loosely against one another. In a subsequent second step 50, first pressure plates 34 are fastened to one another by first threaded rods 38 and pressed against one another and thus also against laminated core 26. Consequently, the individual sheets of laminated core 26 are stabilized relative to one another. In a subsequent third step 52, each permanent magnet 30 is disposed in one of pockets 28, for which purpose each permanent magnet 30 is inserted in the axial direction 24 into each associated pocket 28. In this case, detachment of the sheets from one another is prevented by first pressure plates 34 fastened to one another, so that even with a clearance fit or a press fit between laminated core 26 and permanent magnet 30, the detachment of laminated core 26 is prevented. In a subsequent fourth step 54, second pressure plates 40 are mounted, and thus permanent magnets 30 are stabilized in axial direction 24 as well. Further, laminated core 26 is pushed onto shaft 18, wherein here as well damage to laminated core 26 or a displacement of the individual sheets of laminated core 26 is prevented by first pressure plates 26. Alternatively, shaft 18 is mounted at any time but at least only after second step 50.

Figure 5:
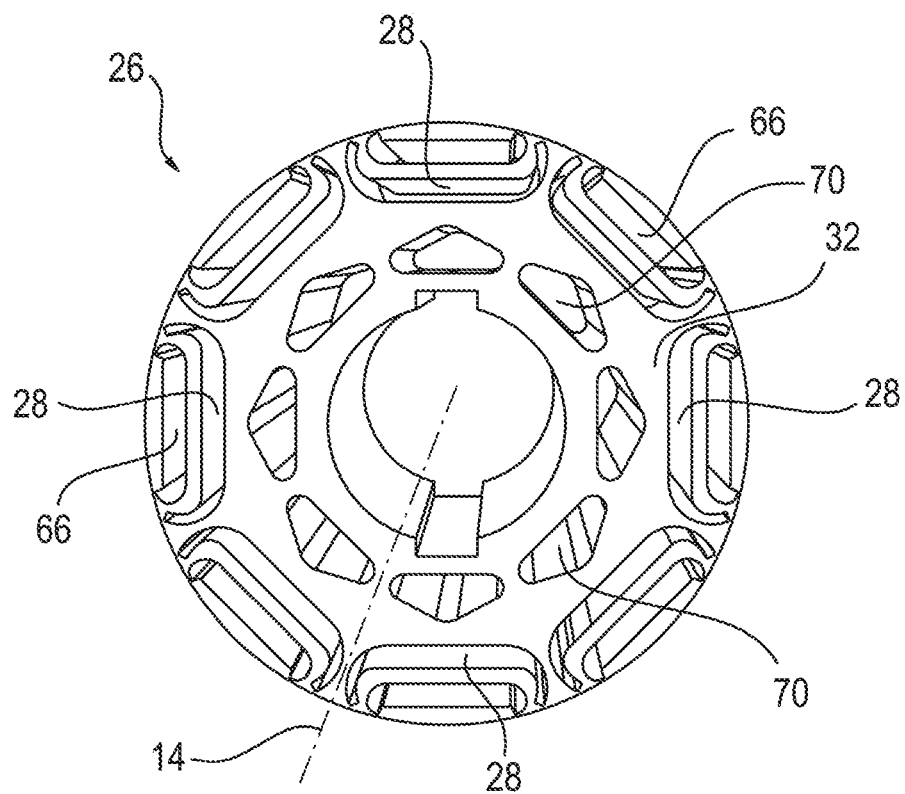
FIG. 5 in a perspective view shows a laminated core of the rotor.
Figure 6:
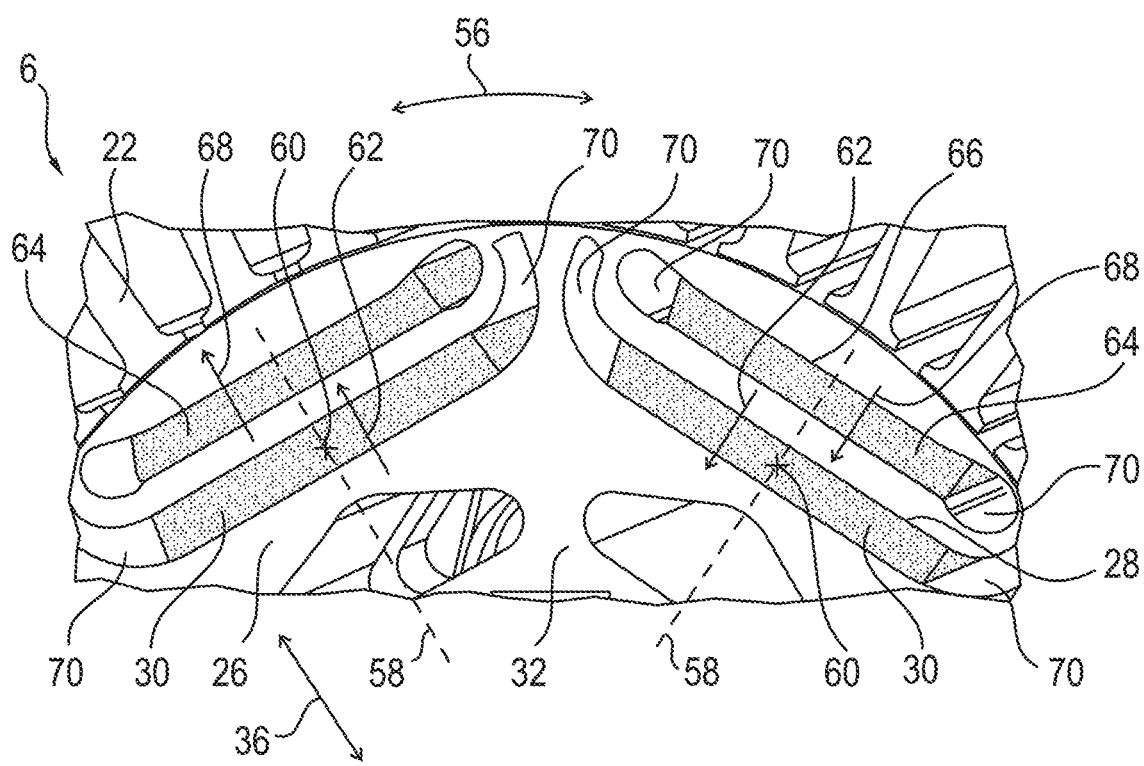
FIG. 6 shows in a detail the laminated core with pockets, wherein each pocket is associated with a permanent magnet.

In FIG. 5, laminated core 26 is shown in a top plan view of one of the end faces 32. FIG. 6 shows a detail of electrical machine 6, wherein permanent magnets 30, which have a trapezoidal cross section perpendicular to axis of rotation 14, therefore, perpendicular to axial direction 24, are installed in pockets 28. The trapezoid is uniform and all permanent magnets 30 are structurally identical to one another. The cross section of pockets 30 perpendicular to axial direction 24, therefore, perpendicular to axis of rotation 14, is also trapezoidal and the same as the cross section of permanent magnets 30, so that a clearance fit is created between them. In this case, both pockets 28 and permanent magnets 30 are disposed substantially in tangential direction 56.

The orientation of pockets 28 adjacent in a tangential direction 56 is different, so that likewise the orientation of permanent magnets 30 adjacent in tangential direction 56 is alternating. In other words, each permanent magnet 30 is associated with a radial straight line 58 which intersects the center of gravity 60 of each of the cross sections of the respective associated permanent magnet 30 and axis of rotation 14. In this case, permanent magnets 30 are arranged mirror-symmetric with regard to the respective radial straight lines 58 and have a magnetization direction 62 which is parallel to the respective radial straight lines 58. In other words, permanent magnets 30 are magnetized in radial direction 36. Here, magnetization direction 62 of permanent magnets 30 adjacent in tangential direction 56 differs, so that permanent magnets 30 are magnetized alternately inward and outward in radial direction 36. In summary, permanent magnets 30 adjacent in tangential direction 56 can only be installed in a single position in respective pocket 28, and magnetization direction 62 of permanent magnets 30 adjacent in tangential direction 46 is rotated by 180° with respect to radial straight lines 58 associated with the respective permanent magnet 30.

Each radial straight line 58 is further associated with second permanent magnets 64, which are structurally identical to one another. Thus, rotor 16 has as many second permanent magnets 64 as permanent magnets 30. The associated radial straight line 58 here as well intersects the center of gravity of second permanent magnets 64, which are arranged mirror-symmetric with regard to the respective radial straight lines 58 in tangential direction 56, and likewise have a trapezoidal cross section. Each of the second permanent magnets 64 is mounted in a respective associated second pocket 66 with the formation of a clearance fit, so that second permanent magnets 64 adjacent in tangential direction 56 can be installed only in a single position in the respective associated second pocket 66. Second permanent magnets 64 have a second magnetization direction 68 which is parallel to magnetization direction 62 of permanent magnet 30 associated with the same radial straight line 58.

Each pocket 28 and each second pocket 66 are associated in each case with two chambers 70, which are then adjacent to respective pocket 28, 66 in the tangential direction 56 and spaced from respective pocket 28, 66 by means of a web. Thus, a flux barrier portion is provided, which improves functioning as a synchronous reluctance motor. Further, laminated core 26 has eight cooling openings 70, which extend through laminated core 26 in axial direction 24. In this case, in each case one of cooling openings 70 is offset inward in radial direction 36 in relation to one of pockets 28, and rotor 16 thus has a total of eight pockets 28. During operation, air passes through cooling openings 70 and rotor 16 is cooled in this manner.

Figure 7:
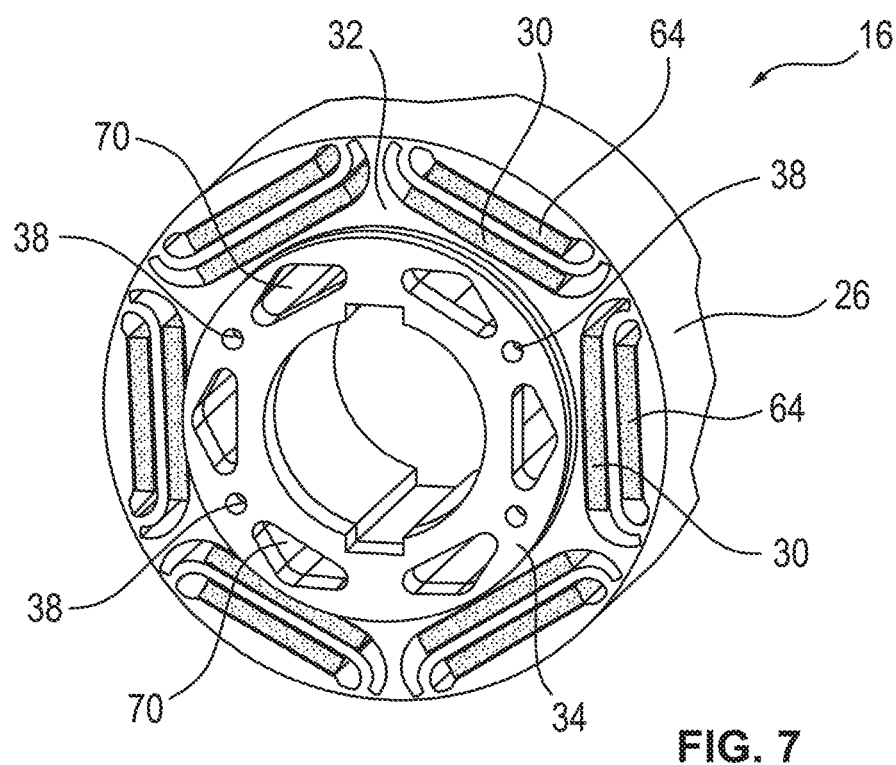
FIG. 7 in a perspective view shows the laminated core with an abutting first pressure plate.

In FIG. 7, rotor 16 is shown perspectively with a view of one of the end faces 32 of laminated core 26, said end face within which permanent magnets 30 and second permanent magnets 64 are installed. Also, first pressure plate 34 is shown, which non-positively abuts end face 32 and which is fastened by means of first threaded rods 38. First pressure disk 34 has openings corresponding to cooling openings 70, so that during operation cooling air can also pass through first pressure plate 34.

Figure 8:
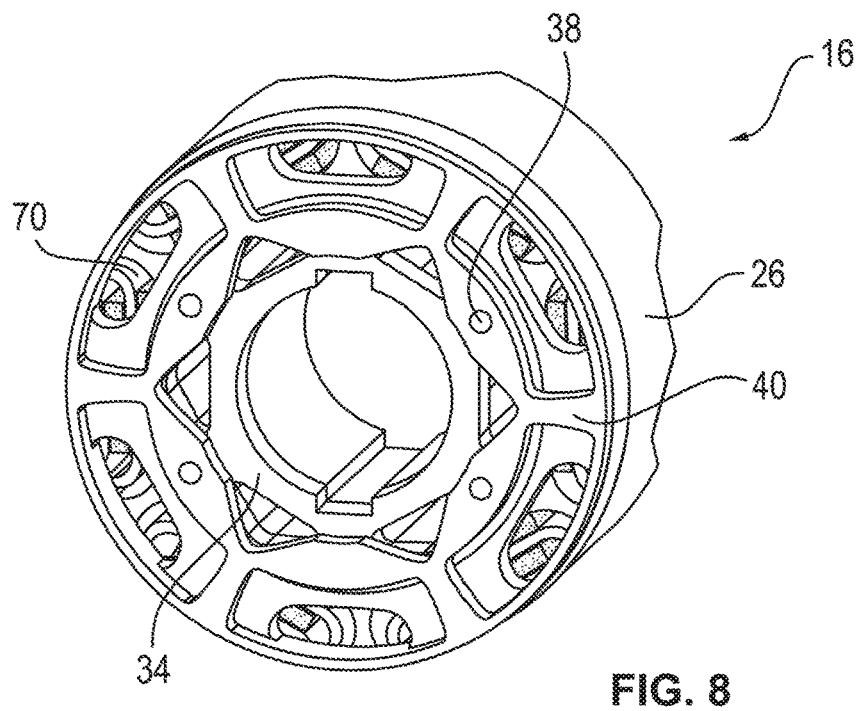
FIG. 8 in a perspective view shows the laminated core with the abutting first pressure plate and an abutting second pressure plate.

FIG. 8 shows rotor 16 with mounted second pressure plate 40, by which the complete end face 32 of laminated core 26 is covered. In this case, however, second threaded rods 44 have been dispensed with, and second pressure plate 40 is also fastened by first threaded rods 38 to the other components of rotor 16. Thus, detachment of permanent magnets 30 and second permanent magnets 64 is prevented by second pressure plate 40. Here, second pressure plate 40 is not designed fully closed, so that passage of air through chambers 70 is possible. In this way, weight and thus inertia of rotor 16 are reduced.

Figure 9:
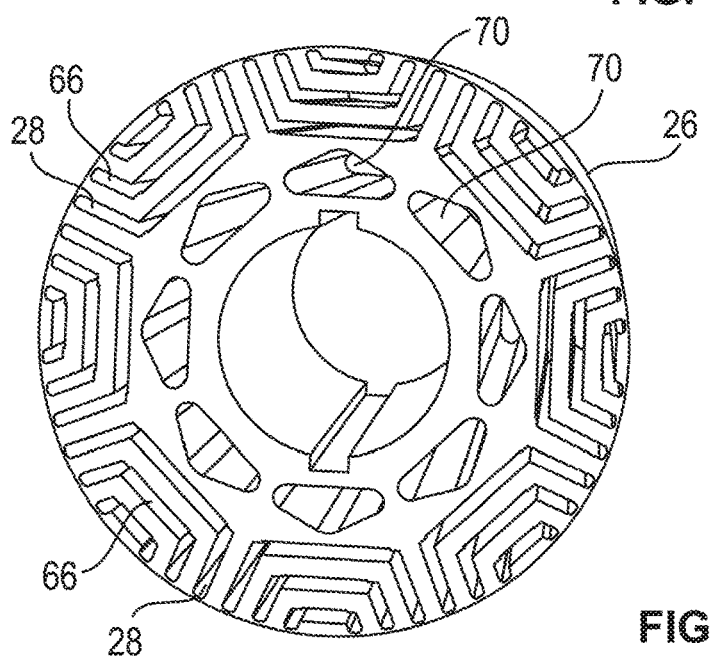
FIG. 9 in a perspective view shows a further embodiment of the laminated core of the rotor.
Figure 10:
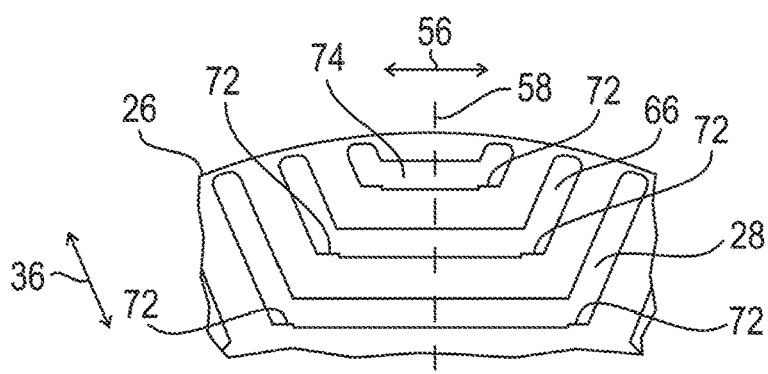
FIG. 10 shows in a detail the laminated core according to FIG. 9.

FIG. 9 shows a further embodiment of laminated core 26. Here, cooling openings 70 are not changed. However, pockets 28 and second pockets 66 are modified and are configured crescent-shaped, pointing outward in radial direction 36, as shown in FIG. 10. Each pocket 28 and each second pocket 66 have a retaining element 72, by means of which the respectively associated permanent magnet 30 or second permanent magnets 64 are held in tangential direction 56 and thus its orientation is determined. Consequently, here as well, each permanent magnet 30 or second permanent magnet 64 can be installed only in a single position. Pockets 28 and second pockets 66 are configured symmetric with regard to the respective associated radial straight lines 58 and are configured U-shaped or crescent-shaped. In this case, each pocket 28 surrounds the respectively associated second pocket 66 in tangential direction 56.

In addition, laminated core 26 has a total of eight third pockets 74, which likewise each have retaining element 72, and are configured crescent-shaped, in particular U-shaped or crescent-shaped, and point outward in radial direction 36. Third pockets 74 as well are arranged axially symmetric with regard to the respective associated radial straight lines 58 and are offset outward in radial direction 36 with regard to the respective associated pocket 28 and second pocket 66, so that both the associated second pocket 66 and pocket 28 surround third pockets 74 in tangential direction 56.

A third permanent magnet, which also has a trapezoidal cross section, is disposed in each case in each third pocket 74. It is ensured by retaining elements 72 that the respectively associated third permanent magnet can be mounted only in a single position within the respective third pocket 74. In this case, the magnetization direction of every third permanent magnet is parallel to magnetization direction 62 of permanent magnet 30 associated with the same radial straight line 58. Consequently, each of the radial straight lines 58, which are each offset from one another by an angle of 45°, is associated with one of the permanent magnets 30, one of the second permanent magnets 64, and one of the third permanent magnets, thus each forming a group of permanent magnets.

Figure 11:
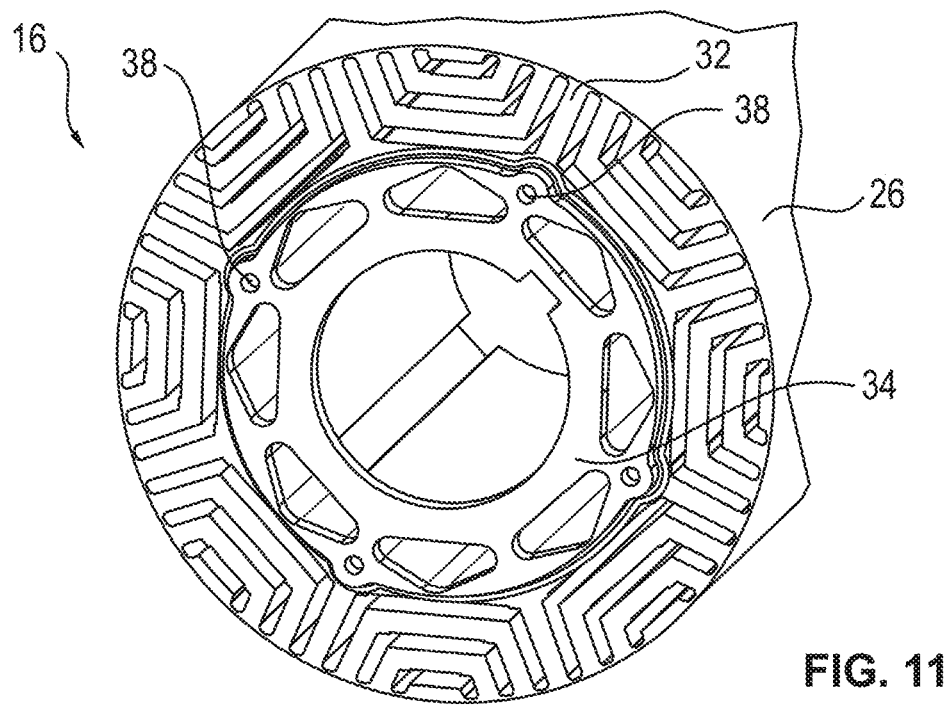
FIG. 11 in a perspective view shows the laminated core according to FIG. 9, with the abutting first pressure plate.
Figure 12:
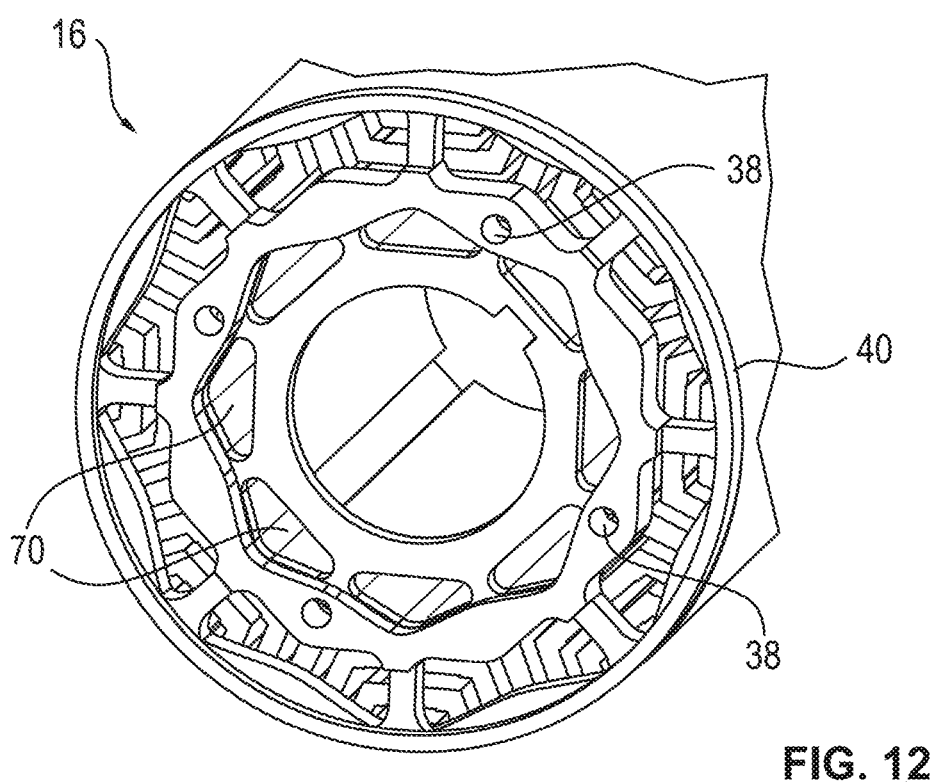
FIG. 12 in a perspective view shows the laminated core according to FIG. 9, with the abutting first pressure plate and the abutting second pressure plate.

FIG. 11 shows rotor 16 with a view of one of end faces 32 of laminated core 26, wherein the adapted first pressure plate 34 is fastened by first threaded rods 38 to the end face. FIG. 12 additionally shows second pressure plate 40, which is likewise fastened by first threaded rods 38. First pressure plate 34 is offset inward in radial direction 36 with respect to pockets 28, second pockets 66, and third pockets 74, and thus does not cover them. Second pressure plate 40, however, covers at least partially all pockets 28 as well as all second pockets 66 and all third pockets 74, so that detachment of permanent magnets 30, second permanent magnet 64, and third permanent magnets is prevented.

In summary, it is ensured by means of the trapezoidal configuration of permanent magnets 30 and the corresponding configuration of pockets 28 that permanent magnets 30 are always mounted with the correct polarization, so that production takes place more effectively, faster, and with less waste. It is possible in this case to make permanent magnets 30 and any existing second permanent magnets 64 and any existing third permanent magnets of a ferrite, wherein due to the design of pockets 28, second pockets 66, and any third pockets 74, and/or any chambers 70, a torque is increased due to the formation of a reluctance force. The individual sheets of laminated core 26 are secured to one another by means of first pressure plates 34, so that mounting of permanent magnets 30, second permanent magnet 64, and any third permanent magnets can be done without the sheets detaching from one another. Detachment of permanent magnets 30, second permanent magnets 64, and any third permanent magnets is prevented by second pressure plates 40, wherein this has no or only relatively little effect on the magnetic properties of rotor 16.

The invention is not limited to the exemplary embodiments described above. Rather, other variants of the invention can also be derived herefrom by the skilled artisan, without going beyond the subject of the invention. Particularly, further all individual features described in relation to the individual exemplary embodiments can also be combined with one another in a different manner, without going beyond the subject of the invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims:

What is claimed is:

1. An electrical machine comprising:
a rotor having a number of similar permanent magnets, which are disposed in an associated pocket of the rotor, wherein the permanent magnets adjacent in a tangential direction are configured to be installed only in one position in a respective pocket, in which a magnetization direction is rotated by 180° with respect to a radial straight line associated with the respective permanent magnet,
wherein the rotor comprises a laminated core having the pockets and having a number of sheets stacked one above the other in an axial direction, wherein a first one of the end faces of the laminated core has openings corresponding to and aligned with the pockets, such that the permanent magnets inside each one of the pockets are freely accessible via the openings, wherein the first one of the end faces is partially covered with a first pressure plate that is offset inward in a radial direction with respect to the pockets, such that the first pressure plate does not cover any of the openings of the first one of the end faces that correspond to and align with the pockets, and wherein the first pressure plate non positively abuts the laminated core.

2. The electrical machine according to claim 1, wherein the first one of the end faces or a second one of the end faces of the laminated core is partially covered by a second pressure plate which at least partially covers the pockets.

3. The electrical machine according to claim 1, wherein each radial straight line intersects a center of gravity of the respective associated permanent magnet.

4. The electrical machine according to claim 1, wherein the magnetization direction is substantially parallel to the respective radial straight line.

5. The electrical machine according to claim 1, wherein a cross section of each permanent magnet substantially perpendicular to an axial direction of the rotor is trapezoidal.

6. The electrical machine according to claim 5, wherein a cross section of the pockets substantially perpendicular to the axial direction is the same as the cross section of the permanent magnets substantially perpendicular to the axial direction.

7. The electrical machine according to claim 1, wherein each pocket is associated with a chamber that adjoins the respective pocket in the tangential direction.

8. The electrical machine according to claim 1, wherein the pockets are crescent-shaped pointing outward in a radial direction.

9. The electrical machine according to claim 1, wherein the electrical machine is a synchronous reluctance motor.

10. The electrical machine according to claim 1, further comprising a second pressure plate, the second pressure plate partially covering the first one of the end faces that is partially covered with the first pressure plate, wherein the second pressure plate partially covers the openings of the first one of the end faces that correspond to and align with the pockets, and wherein the first pressure plate is positioned between the first one of the end faces and the second pressure plate.

11. The electrical machine according to claim 10, wherein an outer peripheral portion of the second pressure plate directly abuts the first one of the end faces.

12. The electrical machine according to claim 10, wherein a surface of the second pressure plate that faces the first one of the end faces is provided with a recess, and wherein the first pressure plate is accommodated within the recess.

13. The electrical machine according to claim 7, further comprising cooling openings spaced radially inward from the pockets, wherein the first pressure plate has openings that correspond to and align with the cooling openings.

14. A rotor of an electrical machine, the rotor comprising:
a number of similar permanent magnets, which are disposed in an associated pocket of the rotor,
wherein the permanent magnets adjacent in a tangential direction are configured to be installed only in one position in a respective pocket, in which a magnetization direction is rotated by 180° with respect to a radial straight line associated with the respective permanent magnet, and
wherein the rotor comprises a laminated core having the pockets and having a number of sheets stacked one above the other in an axial direction, wherein a first one of the end faces of the laminated core has openings corresponding to and aligned with the pockets, such that the permanent magnets inside each one of the pockets are freely accessible via the openings, wherein the first one of the end faces is partially covered with a first pressure plate that is offset inward in a radial direction with respect to the pockets, such that the first pressure plate does not cover any of the openings of the first one of the end faces that correspond to and align with the pockets, and wherein the first pressure plate non positively abuts the laminated core.

* * * * *